United States Patent [19]

Dörömbözi et al.

[11] 4,367,141
[45] Jan. 4, 1983

[54] APPARATUS FOR THE CONCENTRATION OF SLUDGES AND SUSPENSIONS

[76] Inventors: Béla Dörömbözi, 37, Kilián körut, Tatabánya V.; Csaba Égetö, 21c, Irhás árok, 1121, Budapest; György Kálmán, 15, Ságvári ut, Tatabánya I.; Károly Solymos, 11, Ságvári ut, Tatabánya I.; Zoltán Szalay, 50, Mártirok u., Tatabánya V., all of Hungary

[21] Appl. No.: 180,162

[22] Filed: Aug. 21, 1980

[30] Foreign Application Priority Data

Sep. 25, 1979 [HU] Hungary .................. TA 1526

[51] Int. Cl.³ .................................................. B01D 21/06
[52] U.S. Cl. .................................. 210/145; 210/520; 210/525; 210/530; 210/531
[58] Field of Search ............... 210/513, 523, 525, 528, 210/530, 531, 112, 113, 145, 147, 520

[56] References Cited

U.S. PATENT DOCUMENTS

| | | | |
|---|---|---|---|
| 2,267,516 | 12/1941 | Adam | 210/530 |
| 2,566,988 | 9/1951 | Kolb | 210/531 |
| 2,894,637 | 7/1959 | Schreiber | 210/528 |
| 3,175,692 | 3/1965 | Vrablik | 210/528 |
| 3,227,278 | 1/1966 | Johnson | 210/525 |
| 3,542,207 | 11/1970 | Stansmole | 210/528 |
| 3,595,783 | 7/1971 | Pflanz et al. | 210/528 |
| 3,616,910 | 11/1971 | Gericke | 210/531 |
| 3,685,654 | 8/1972 | MacLellan et al. | 210/528 |
| 3,864,257 | 2/1975 | Shuffer | 210/528 |
| 3,919,090 | 11/1975 | Shiffer | 210/525 |
| 3,951,806 | 4/1976 | Young | 210/525 |
| 4,000,075 | 12/1976 | Wooh | 210/528 |
| 4,053,421 | 10/1977 | Pontz et al. | 210/528 |
| 4,193,877 | 3/1980 | Lllywhite | 210/525 |

Primary Examiner—Peter A. Hruskoci
Attorney, Agent, or Firm—Gabriel P. Katona

[57] ABSTRACT

The apparatus is suitably disposed within a circular tank and comprises a stationary bridge, a feeding bell, a scraper, driving means, and an optional foam scraping means. The apparatus is characterized in that it has a centrally suspended rotating scraper, mounted from a central vertical shaft and driven by a drive which travels along the rim of the tank, and additionally has at least one rotating drive arm. The drive arm is connected at one end to the drive and at its other end to the feeding bell, which is supported by the shaft of the scraper. The feeding bell is preferably capable of vertical adjustment. The scraper is preferably provided with at least one row of a plurality of vertical stick-like members. A foam scraper is optionally attached to the drive arm. The apparatus additionally contains means for automatically raising or lowering the scraper. depending on the relative rotary momentum between the scraper and the rim drive.

8 Claims, 6 Drawing Figures

APPARATUS FOR THE CONCENTRATION OF SLUDGES AND SUSPENSIONS

The present invention provides an apparatus for the concentration of sludges and suspensions. The apparatus has utility in various fields of technology (eg. mineral preparation, treatment of sludges, etc.)

A variety of more or less different types of apparatuses have been employed for the concentration of sludges and suspensions. They differ principally in the means employed for securing movement of the scraper. From this standpoint, prior art apparatuses for concentration of sludges and suspensions can be arranged into three groups:

(a) Apparatuses in which the scraper is rotated by a central drive mechanism by means of an axis which rotates together with the scraping apparatus. The electric motor (which provides the energy) and the drive mechanism (which is usually of unitary construction and is hereinafter referred to as the moving means) are mounted on a bridge disposed over the concentrating tank and supported on the rim of the tank or on the standing shaft. The mounting means drives the centrally located central shaft.

(b) Apparatuses having a centrally formed standing shaft. The scraper is rotated by a bridge supported by the shaft and by means of rollers on the rim of the tank.

(c) Apparatuses wherein exterior, not centrally located, moving means operates the scraper through the interposition of other mechanical components.

Opened Hungarian patent application Ser. No. T/16044 of Aluminiumipari describes an apparatus falling within the first group (a). The apparatus is characterized by a rotatable central shaft, a mechanism for rotating the central shaft and a raking arm connected to the central shaft through a connecting element and provided with shovel blades. A coupling system is provided to enable lifting of the raking arm by rotation around a single point so as to avoid overloading caused by the sludge or suspension layer.

other centrally driven apparatuses are exemplified by British Pat. No. 1,168,303 (DORR), British Pat. No. 1,453,593 (WARMAN), and British Pat. No. 1,300,724 (DORR).

In the apparatus of British Pat. No. 1,300,724, the scraper is rotated along with a feeding bell by moving means located on a stationary bridge. The scraper and the feeding bell are, however, rigidly connected to a guard shaft. Consequently, it is not possible to vertically adjust it, much less do same automatically.

An apparatus of the second group (b) is exemplified by the apparatus of Vizgépészeti Vallalat. In such apparatus, the bridge that supports and rotates the scraper is rotated by a drive which runs along the rim of the tank. The apparatus of British Pat. No. 1,177,770 (AMES) operates on a similar principle.

British Pat. No. 1,327,884 (McNALLY) illustrates an apparatus of group (c). In such apparatus, an endless rope drive, completely independent from the concentrating tank, assures rotary movement of the scraper. The apparatus is very complicated and has many sources of error.

British Pat. No. 1,260,278 (PASSAVANT) describes an apparatus which employs a drive means which though exterior to the scraping apparatus is closely connected to the concentrating tank. In such apparatus the scraper is carried on and rotated by a revolvable support mechanism which is centered on a bridge over the tank by a centering means. The apparatus is characterized in that it has no other central means for supporting the revolvable support mechanism. Both ends of the revolvable support mechanism have to be supported. Under such circumstances, the revolvable support mechanism and its centering means must carry the entire weight of the scraper.

French Pat. No. 2.255,932 (DORR) can also be viewed as belonging to this group. In the apparatus of this patent, the scraper is rotated by a centrally supported drag means driven on the rim of the tank. The scraper is connected to the drag means by ropes which enable the eventual rotation around one point and also enable it to be detoured when the sludge or suspension accumulates. Lifting of the scraper is not ensured in such apparatus.

The present invention seeks to remedy the drawbacks of heretofore known apparatuses. It provides a simple mechanical means for driving the scraper. The mechanical connection of the functional parts permits raising and lowering of the scraper in a self-regulating manner. Alternatively, the feeding bell can be automatically adjusted in response to varying operating and loading conditions on the scraper. The apparatus of the present invention is simpler and more easily regulatable than special central unitary rotating apparatuses of the prior art. Additionally, the apparatus of the present invention is capable of broad use since it employs the building block principle.

The apparatus of the instant invention is suitable for the concentration of sludges and suspensions. The apparatus is preferably arranged in a circular container or tank and is comprised of a stationary bridge, a feeding bell, a scraper and means for driving the scraper. The apparatus may also contain foam scraping means. The present apparatus is characterized in that it has at least one rotating arm between the drive means, disposed on the edge or rim of the container, and the feeding bell, supported by the scraping shaft. The apparatus also has a rotating scraper which can be raised or lowered.

In one embodiment of the apparatus of the present invention, the feeding bell can be adjusted vertically. In another embodiment, the scraper has a row or plurality of rows of vertical stick-like members. The drive means is comprised of one or more components, including, an electrical motor, a transmission mechanism, a drive mechanism having replacable gears and, in a given case, running rollers having a drag resistant rubber surface, and other structural elements which provide for uniform peripheral speed. The foam scraping means is preferably a fixed or tiltable scraping plow connected to the rotating arm and is either flat or has a convex curvature when viewed from the direction of rotation. Preferably, it has a parabolical curvature.

In a further embodiment, the apparatus of the present invention contains means for raising or lowering the scraper in the vertical direction in response to the instantaneous load on the scraper. The automatic vertical adjustment may be responsive to and regulated in accordance with the determined momentum around the scraping shaft and rotating shaft. Means may be provided for signaling this automatic adjustment. Preferably, the apparatus additionally has a waterproof source of energy and means, regulated by the scraper, for automatically disconnecting the drive.

An embodiment of the sludge and suspension concentrating apparatus of the present invention is hereinafter described with reference to the drawings in which.

Figure 1:
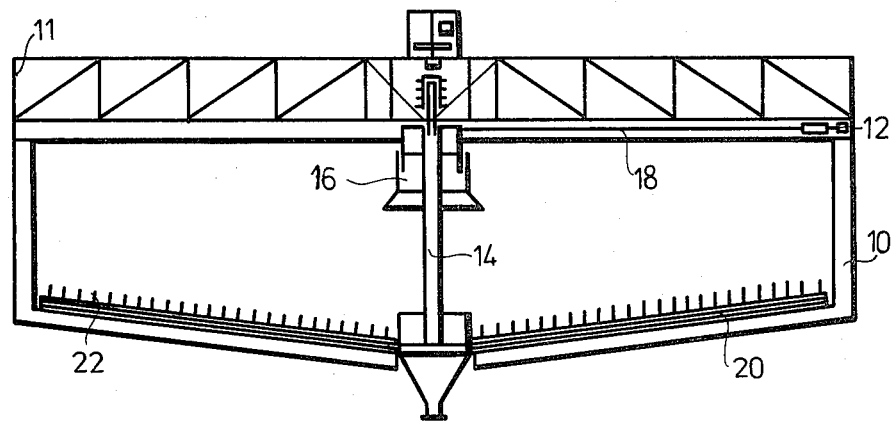
FIG. 1 is a vertical cross-section of a concentrating container or tank provided with a scraper.
Figure 2:
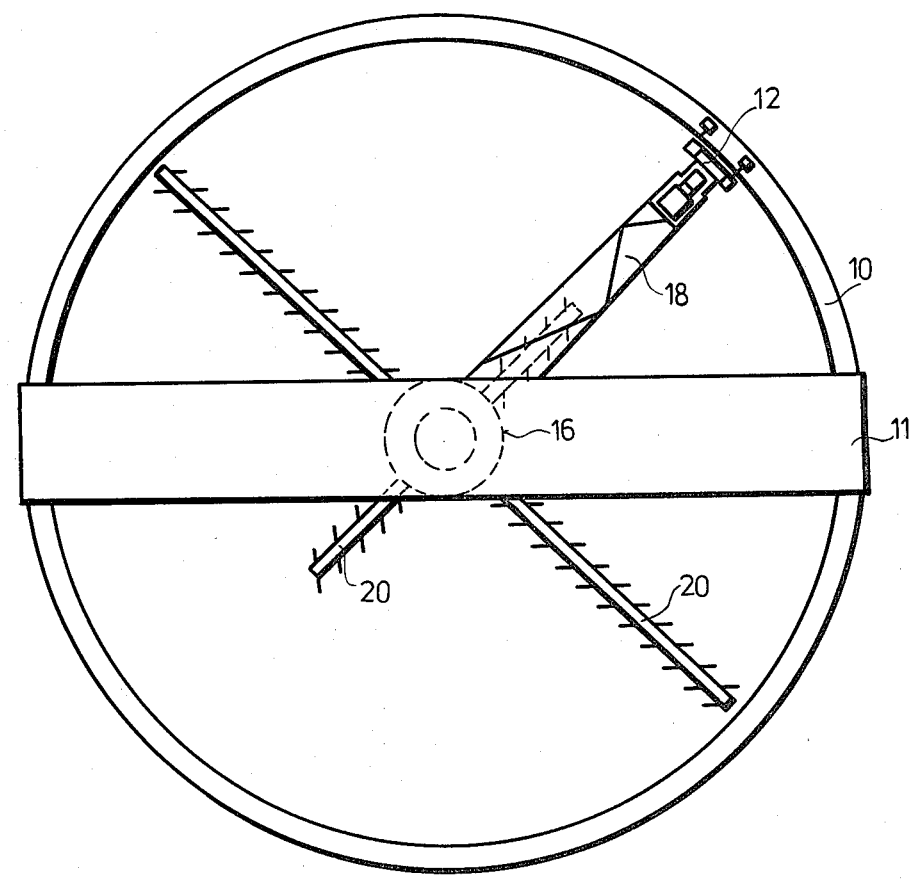
FIG. 2 is a plan view of the container or tank of FIG. 1 with the rotating arm shown in a rotated position.

As shown in FIGS. 1 and 2, scraper 20 is centrally suspended from the stationary bridge 11 which is supported on the tank 10. Rotating arm 18 is connected to a feeding bell 16 on one side and on the other side to a drive 12 which travels along a bearing path on the rim or edge of tank 10. Scraper 20 has a row of vertically extending stick-like members 22 which serve to improve the efficiency of the concentration. By appropriate selection of the length of members 22, the constancy of the vertical dimension (viz. depth) of the tank can be improved.

The bottom of the container or tank 10 can be flat or can be of conical shape. With large tanks 10, for example, tanks of over 18 meters in diameter, two drives disposed opposite one another can be provided.

The vertical adjustment of feeding bell 16 can be secured by means of, for example, a rotating-free connection (not shown in the drawing).

Figure 3:
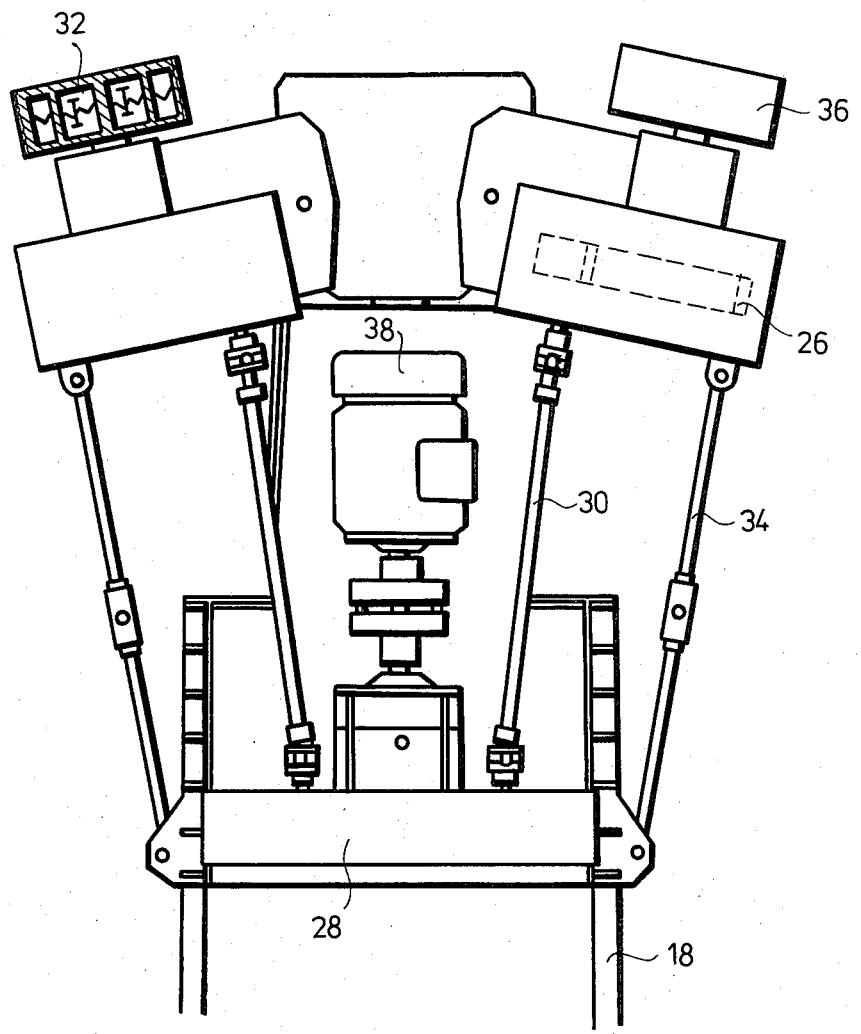
FIG. 3 is an enlarged view of a drive for the rotating arm.

FIG. 3 shows the individual parts of drive 12. The energy is provided by electric motor 38 through a clutch to a drive mechanism 28. The rotary force of the drive mechanism 28 is transmitted, through a drive shaft 30 and gears 26, to running rollers 36. An adjusting rod 34 enables adjustment of the drive 12 to adapt it to tanks of various diameters. The angular deviation stemming from the change in tank diameter is equalized by a drive shaft 30 between the drive mechanism 28 and the runing roller 36. Equalizing means 32, built into the running roller 36, are adapted to receive and equalize the variations in angular velocity of the drive shaft 30.

Figure 4:
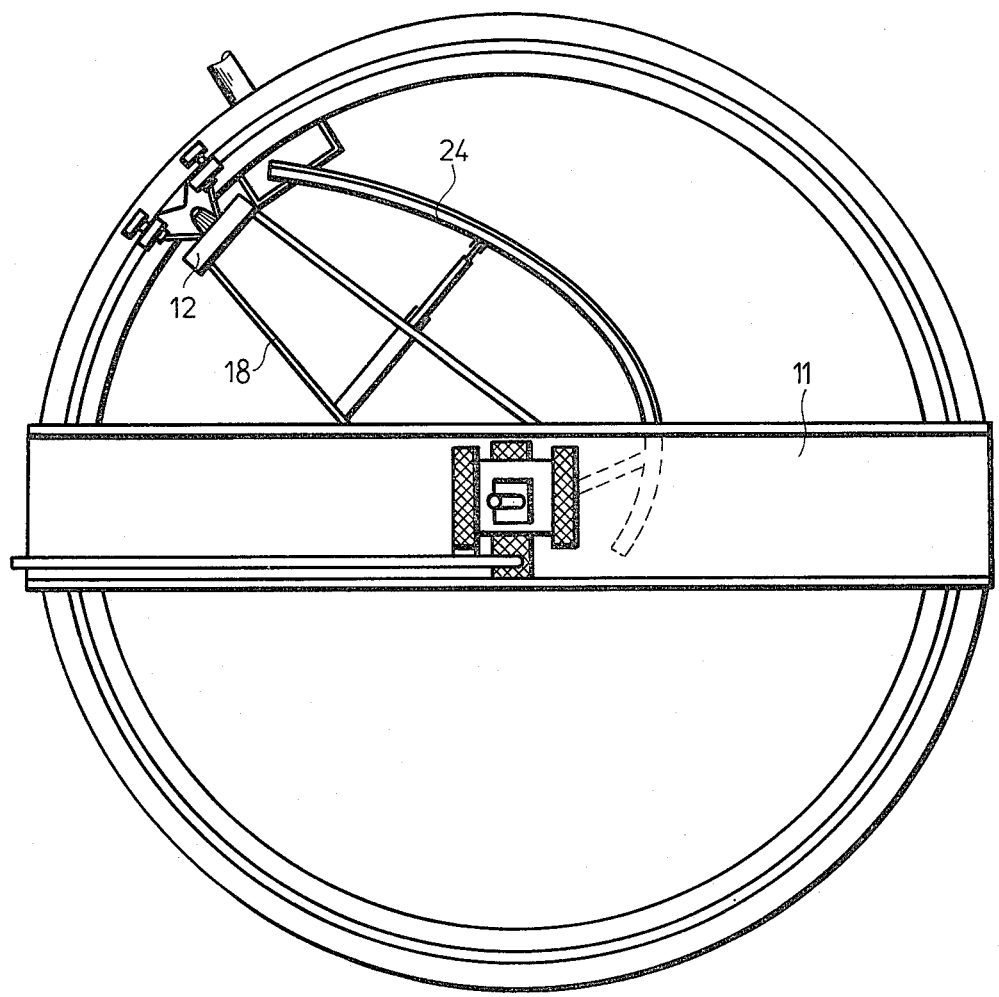
FIG. 4 is a partial plan view of the concentrating tank, showing the scraping plow.

FIG. 4 illustrates the apparatus of the present invention, including a foam scraper 24. As shown in the drawing, foam scraper 24 is a tiltable convex parabolic scraping plow, when viewed from the direction of rotation. Foam scraper 24 is mounted on rotating arm 18 and consequently does not require separate drive means.

Figure 5:
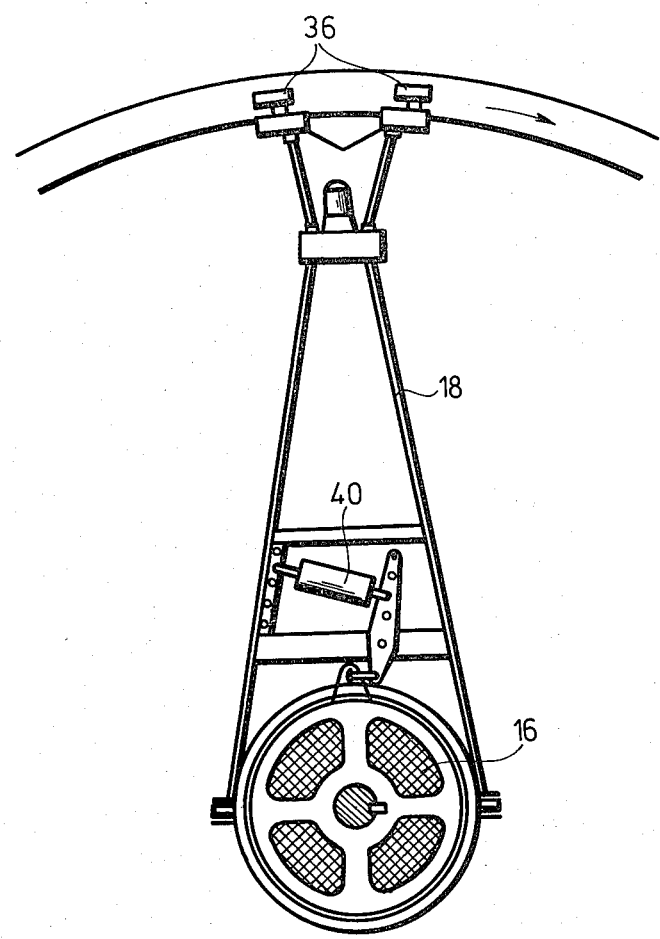
FIG. 5 is a partial plan of the rotating arm.

FIG. 5 illustrates the means for automatic raising and lowering of the scraper 20 in response to the instantaneous sludge or suspension density. In the depicted embodiment, the rotary momentum is transferred from the scraper 20 through a spring balance 40 connected to a switch which operates the motor which raises or lowers scraper 20. Thus, automatic raising or lowering of scraper 20 is attained utilizing the mechanical possibility created by the transmission relationships of rotating arm 18.

Figure 6:
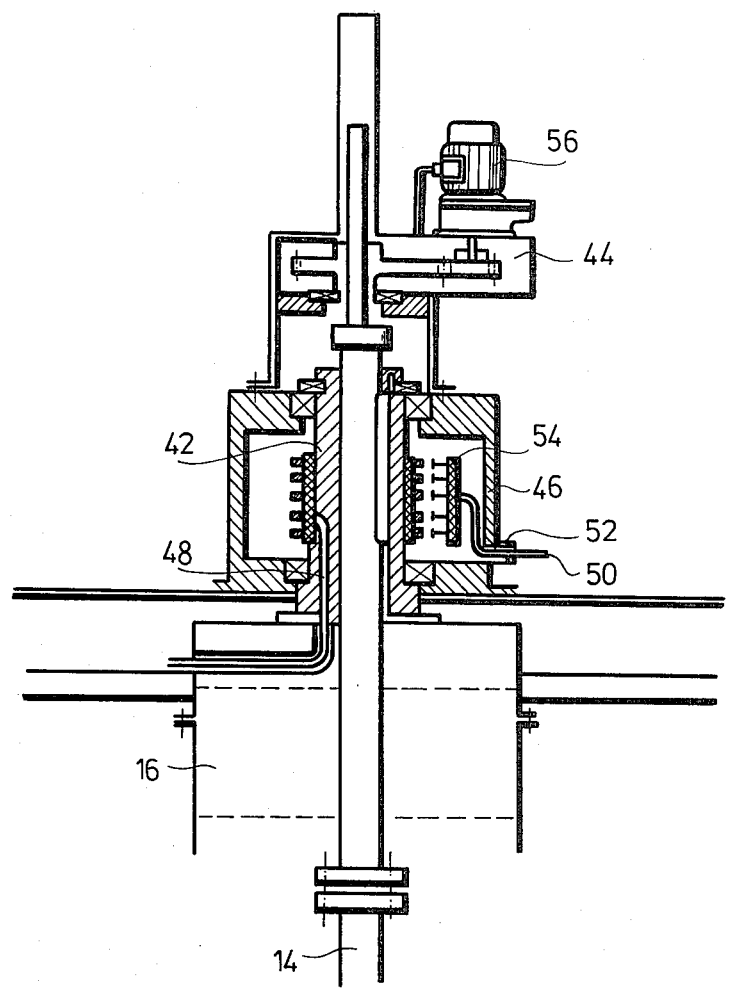
FIG. 6 is an enlarged view of the scraping shaft and the waterproof energy source.

FIG. 6 shows the waterproof energy supply of the apparatus of the present invention. Accordingly, the energy providing system of electric motor 38 (shown in FIG. 3) which drives scraper 20, is built on main shaft sleeve 42.

The main shaft sleeve 42 is supported on roller bearings disposed in a main shaft closet 44. The main shaft sleeves are provided with sliding retainer grooves and are of hollow construction. Main shaft sleeve 42 carries an appropriate number of sliding rings 46 which are mounted in an insulating fashion. Main shaft sleeve 42 has a bore 48 through which the cable for the sliding rings 46 is conducted to the protective pipe of the feeding bell 16 and from there to the electric motor 38 and respectively to the spring balance 40 which controls the automatic lifting of the scraper. Feeder cable 50 is conducted through a waterproof bushing 52 to the connecting strip 54 in which carbon brushes are located biased with a spring against sliding rings 46.

The concentrating apparatus of the present invention operates in the following manner:

The suspension is introduced through rotating feeding bell 16 which is disposed on stationary bridge 11. This ensures damping. It also ensures favorable spreading of the particles that are to be settled and accomplishes this by preventing the creation of streams opposite to the direction of rotation of the scraper.

The solid phase settles slowly in tank 10. Suspension of the solid phase can in a given case be promoted by addition of flocculants. The continuous slow rotation of scraper 20 also promotes separation of the solid phase and simultaneously provides for movement of the already separated solid phase towards the sludge or suspension removal point.

Scraper 20 has a row of vertical members 22 which serve to prevent the already settled solid phase from being stirred up during slow rotation of the scraper. Moreover, in the flake zone above the mechanism, the row of vertical members 22 causes collisions between the flakes. Coalescence of the flakes into a barrier layer, with consequent formation of a zone which serves to hinder sedimentation, is thereby obviated. The row of vertical members 22 therefore serves to promote sedimentation.

With the increased use of flocculating agents there is a corresponding increase in the danger of foaming. The foam and the contaminents in the foam must be removed since they spoil the quality of the water spilling over the rim of the tank. Foam removal is performed by a foam scraping means or foam raking plow 24 mounted on the rotating arm 18. Foam raking plow 24 is suitably provided with a parabolic curvature and because of its convex shape (when viewed from the direction of rotation) it serves to drive the foam toward the wall of the tank 10 and out of the tank 10 through a conventional foam removing channel (not shown).

Scraper 20, when equipped with the drive and structure called for by the present invention, can automatically adjust its height in tank 10 in accordance with the thickness (viscosity) and density of the settled sludge or suspension in the tank. If scraper 20 encounters increased resistance, it will automatically raise itself and relieve the load on it. After a corresponding amount of sludge or suspension is removed from tank 10, scraper 20 will lower itself in the tank. This automatic positioning and, if desired, signaling thereof, is carried out by a momentum transfer mechanism disposed between the rotating arm 18 and the scraper axis 14, and a suitably constructed electrical supplementing mechanism. The required adjustment is provided by a mechanical moving mechanism which is operated by an electric motor 56 (shown in FIG. 6).

Suitable adjustment of feeding bell 16 must be carried out in each case. This is particularly the case when flocculating agents are employed. The vertical dimension of sedimenters and concentrators is generally determined by carrying out sedimenting experiments. Dimensioning is then carried out accordingly. In most cases, however, the suspension which is actually employed in sedimentation plants differs from that which is employed experimentally, because of variations in industrial conditions. This difference would account for certain undesirable effects which can be eliminated by vertical adjustment of the feeding bell 16.

The principal advantages of the apparatus of the present invention may be summarized as follows:

(1) The scraper is driven in a simple mechanical manner and in a way that it can adjust itself automatically according to variations in the load and operating conditions to which it is subjected.

(2) The moving means is of simple construction and consists of elements which can be changed to meet prevailing industrial conditions. Special unitary construction of elements, such as for example, expensive drive mechanisms and electrical motors (with reserves being taken into account) are unnecessary.

(3) The individual elements of the apparatus of the present invention and the construction of such elements enable better satisfaction of concentration technological requirements.

(4) The apparatus of the present invention, through realization of the building block principle, offers the possibility of multiple adjustment thereby ensuring broad based technological utilization of the apparatus.

(5) The apparatus of the present invention makes it possible to completely prefabricate the individual construction elements and to mount them in a simple fashion at the scene of application. In other words, to assemble the apparatus at the industrial site at which it will be utilized. This makes use and operation of the apparatus simpler and at the same time reduces construction and operating costs.

(6) The apparatus of the present invention can be designed to provide a series of typical sizes and can be manufactured and used accordingly.

We claim:

1. An apparatus for concentrating sludges and suspensions comprising a tank having a circular cross-section and a rim;
a central rotatable vertical shaft in the tank;
means for supporting the shaft;
a scraper in the tank and mounted from the shaft;
a feeding bell mounted from the shaft;
and means for rotating the scraper about the shaft, wherein the improvement comprises the means for rotating the scraper is a rim drive mounted on and moveable along the rim, the rim drive comprises a driven roller moveable along the rim and a drive arm communicating at one end with the driven roller and at another end with the shaft;
means are provided for moving the scraper along its vertical axis;
means are also provided for sensing relative rotary momentum between the scraper and the rim drive and activating the means for moving when such difference reaches a predetermined value, the means for sensing relative rotary momentum comprises a spring balance arm communicating at one end with the drive arm and at another end with the shaft;
means are further provided for activating the means for moving, said means for activating communicating with the spring balance arm;
whereby when rotation of the scraper is hindered relative rotary momentum between the scraper and the drive arm is translated to the spring balance arm which at a predetermined point activates the means for activating the means for moving the scraper along its vertical axis.

2. The apparatus, as claimed in claim 1, wherein the feeding bell is fixed to, and rotates with, the shaft and the feeding bell is connected to said another end of the spring balance arm.

3. The apparatus, as claimed in claim 1, wherein the scraper has a plurality of vertically extending stick-like projections whereby said scraper is rake-like in appearance.

4. The apparatus, as claimed in claim 1, further containing foam scraping means mounted from and rotatable with the drive arm.

5. The apparatus, as claimed in claim 4, wherein the foam scraping means is a parabolically curve scraping plow having a flat or curved shape when viewed from the direction of rotation.

6. The apparatus, as claimed in claim 1, wherein the driven roller is driven by an electric motor through a forced transmission having changeable gears, the driven roller contacts the rim, and is driven thereon, on a wheel having a drag resistant surface, and means are provided to insure uniform peripheral speed of the driven roller.

7. The apparatus, as claimed in claim 1, wherein a plurality of driven rollers are employed.

8. An apparatus for concentrating sludges and suspensions comprising a tank having a circular cross-section and a rim;
a central rotatable vertical shaft in the tank;
means for supporting the shaft;
a scraper in the tank and mounted from the shaft;
a feeding bell mounted from the shaft; and
means for rotating the scraper about the shaft;
wherein the improvement comprises, the means for rotating the scraper is a drive mounted on and moveable along the rim and a drive arm communicating at one end with the drive and at the other end with the shaft, the scraper and the arm being rotated about the shaft by the drive and the apparatus further contains means for moving the scraper along its vertical axis and means for determining relative rotary momentum acting on the drive arm between the central axis and the drive and activating the means for moving the scraper along its vertical axis when the relative rotary momentum reaches a predetermined value, said means for determining relative rotary momentum and activating the means for moving being a spring balance arm connected at one end to the drive arm and at another end to the shaft, and a switch for activating the means for moving the scraper along its vertical axis, the spring balance arm being connected to the switch, whereby when movement of the scraper is impeded, the central shaft is subjected to braking action which increases relative rotary momentum on the drive arm and when the relative rotary momentum reaches a predetermined value between the ends of the drive arm, the spring balance arm activates the switch which in turn activates the means for moving the scraper along its vertical axis.

* * * * *